United States Patent
Poster et al.

(10) Patent No.: US 11,341,790 B2
(45) Date of Patent: May 24, 2022

(54) GEARBOX INTERNAL SENSOR INTEGRATION

(71) Applicant: Bell Textron Inc., Fort Worth, TX (US)

(72) Inventors: Scott David Poster, Arlington, TX (US); Brian Edward Tucker, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 280 days.

(21) Appl. No.: 16/743,988

(22) Filed: Jan. 15, 2020

(65) Prior Publication Data

US 2021/0217255 A1 Jul. 15, 2021

(51) Int. Cl.
| | | |
|---|---|---|
| *G07C 5/08* | (2006.01) | |
| *B64C 27/12* | (2006.01) | |
| *B64D 45/00* | (2006.01) | |
| *F16H 57/04* | (2010.01) | |

(52) U.S. Cl.
CPC .............. *G07C 5/085* (2013.01); *B64C 27/12* (2013.01); *B64D 45/00* (2013.01); *B64D 2045/0065* (2013.01); *F16H 57/0405* (2013.01)

(58) Field of Classification Search
CPC ............ B64D 45/00; B64D 2045/0065; B64D 2045/0085; B64C 27/12; G07C 5/085; G07C 5/008; G07C 5/08; Y02T 50/50; F16H 57/0405
See application file for complete search history.

(56) References Cited

U.S. PATENT DOCUMENTS

| | | | |
|---|---|---|---|
| 8,777,800 B2 | 7/2014 | Morel | |
| 9,026,336 B2 | 5/2015 | Ziarno | |
| 10,334,332 B1 | 6/2019 | Poster et al. | |
| 10,403,059 B2 | 9/2019 | Moravek et al. | |
| 2005/0275528 A1* | 12/2005 | Kates | H04W 52/0225 340/539.22 |
| 2011/0158806 A1* | 6/2011 | Arms | F03D 1/0658 416/31 |
| 2016/0364920 A1* | 12/2016 | Nelson | G07C 5/006 |
| 2017/0011560 A1* | 1/2017 | Sheldon | G07C 5/00 |
| 2017/0138922 A1* | 5/2017 | Potyrailo | G01M 13/021 |
| 2018/0087656 A1 | 3/2018 | Poster et al. | |
| 2019/0080524 A1 | 3/2019 | Tucker | |
| 2019/0186690 A1* | 6/2019 | Berkebile | G07C 5/0808 |

FOREIGN PATENT DOCUMENTS

EP 2366989 A1 9/2011

\* cited by examiner

*Primary Examiner* — Mussa A Shaawat
(74) *Attorney, Agent, or Firm* — Shackelford, Bowen, McKinley & Norton, LLP

(57) ABSTRACT

An exemplary internal wireless sensor monitoring system includes a wireless sensor positioned inside of an enclosed housing to monitor a condition in the housing, a wireless gateway positioned outside of the housing, a gateway antenna located in the housing configured to wirelessly communicate with the wireless sensor, and a conductor extending through a penetration in the housing and connecting the gateway antenna and the wireless gateway.

20 Claims, 3 Drawing Sheets

GEARBOX INTERNAL SENSOR INTEGRATION

TECHNICAL FIELD

This disclosure relates in general to the field of wireless sensors, and more particularly in some embodiments, to gearbox multifunctional antenna penetration for internal sensor integration.

BACKGROUND

This section provides background information to facilitate a better understanding of the various aspects of the disclosure. It should be understood that the statements in this section of this document are to be read in this light, and not as admissions of prior art.

A rotorcraft may include one or more rotor systems including one or more main rotor systems. A main rotor system generates aerodynamic lift to support the weight of the rotorcraft in flight, and thrust to move the rotorcraft in forward flight. Another example of a rotorcraft rotor system is a tail rotor system. A tail rotor system may generate thrust in the same direction as the main rotor system's rotation to counter the torque effect created by the main rotor system. Rotorcraft include one or more engines powering the rotor systems and gearboxes are used to convert between power and torque for the engines and the rotor systems. Sensors may be disposed in one or more systems of the rotorcraft, and may provide data from real time monitoring to rotorcraft systems or to outside data collection servers for later analysis.

SUMMARY

An exemplary internal wireless sensor monitoring system includes a wireless sensor positioned inside of an enclosed housing to monitor a condition in the housing, a wireless gateway positioned outside of the housing, a gateway antenna located in the housing configured to wirelessly communicate with the wireless sensor, and a conductor extending through a penetration in the housing and connecting the gateway antenna and the wireless gateway.

An exemplary rotorcraft includes a wireless sensor positioned inside of a gearbox housing, a wireless gateway positioned outside of the gearbox housing, a gateway antenna located inside of the gearbox housing configured to wirelessly communicate with the wireless sensor, and a conductor extending through a penetration in the housing and connecting the gateway antenna and the wireless gateway.

An exemplary method includes transmitting data from a wireless sensor positioned inside of a gearbox housing to a gateway antenna positioned inside of the gearbox housing, communicating the data from the gateway antenna over a wired connection to a wireless gateway located outside of the gearbox housing, the wired connection passing through a penetration in the gearbox housing, and transmitting the data from the wireless gateway to a rotorcraft computer.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1:
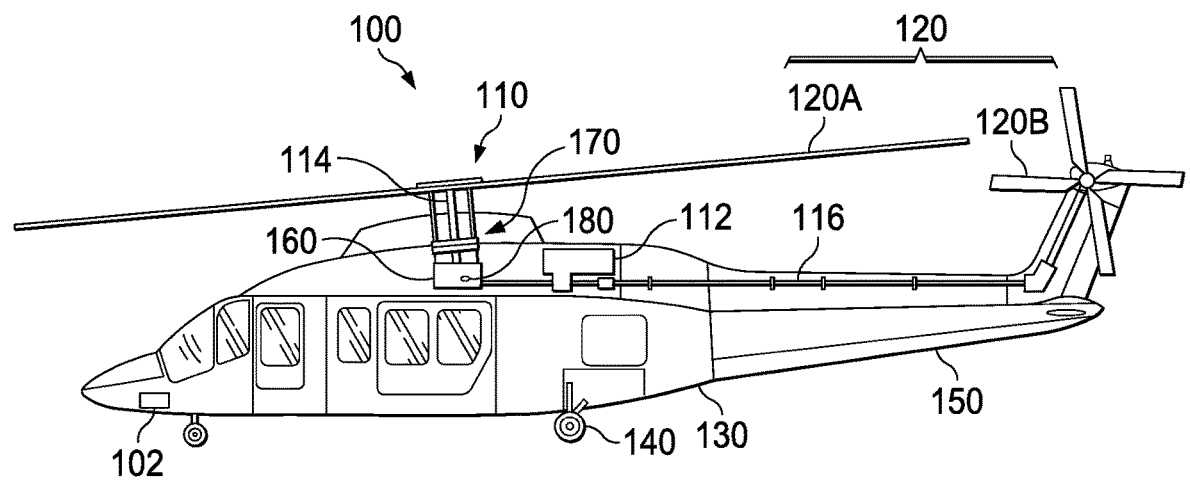
FIG. 1 illustrates an exemplary rotorcraft incorporating a wireless sensor integrated in an enclosed gearbox according to one or more aspects of the disclosure.

It is to be understood that the following disclosure provides many different embodiments, or examples, for implementing different features of various illustrative embodiments. Specific examples of components and arrangements are described below to simplify the disclosure. These are, of course, merely examples and are not intended to be limiting. For example, a figure may illustrate an exemplary embodiment with multiple features or combinations of features that are not required in one or more other embodiments and thus a figure may disclose one or more embodiments that have fewer features or a different combination of features than the illustrated embodiment. Embodiments may include some but not all the features illustrated in a figure and some embodiments may combine features illustrated in one figure with features illustrated in another figure. Therefore, combinations of features disclosed in the following detailed description may not be necessary to practice the teachings in the broadest sense and are instead merely to describe particularly representative examples. In addition, the disclosure may repeat reference numerals and/or letters in the various examples. This repetition is for the purpose of simplicity and clarity and does not itself dictate a relationship between the various embodiments and/or configurations discussed.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "inboard," "outboard," "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. As used herein, the terms "connect," "connection," "connected," "in connection with," and "connecting" may be used to mean in direct connection with or in connection with via one or more elements. Similarly, the terms "couple," "coupling," and "coupled" may be used to mean directly coupled or coupled via one or more elements.

The increasing connectivity within large or complex vehicle such as rotorcraft provides the opportunity to increase the real-time monitoring capabilities of onboard systems, as well as providing ever increasing data for remote analysis. In order to increase the efficiency and ease of operation of a rotorcraft, for example, multiple sensor systems may be provided within the rotorcraft for monitoring different components, systems, flight characteristics or the like. However, many components are not situated so that traditional wired sensors are practical. For example, in remote systems such as sealed subsystems, the casing surrounding the sealed system may prevent an ingress point for power or data cabling for a wired sensor, or the location of significant other elements may require significant work or cost to access or provide power to the monitored system. For components in sealed or relatively inaccessible systems providing hardwired connections for power or data may be prohibitively expensive, or may be difficult for retrofitting existing vehicles to include a sensor system.

FIG. 1 illustrates certain aspects of an exemplary rotorcraft 100 incorporating a wireless sensor 180 located in a sealed location. Rotorcraft 100 includes rotorcraft computers 102, a power train system 110, rotor blades 120, a fuselage 130, landing gear 140, and an empennage 150. Rotorcraft computers 102 may be operable to collect data about, or control flight of, rotorcraft 100. In some embodiments, rotorcraft 100 is a fly-by-wire rotorcraft, and in such embodiments, rotorcraft computers 102 may be flight control computers (FCCs) operable to execute one or more control laws (CLAWS) that control flight of rotorcraft 100. Rotorcraft computers 102 may be operable to perform sensor data collection and analysis as part of a health and usage monitoring system (HUMS), sensor system, control system, monitoring system, or the like. Rotor blades 120 include main rotor blades 120A and tail rotor blades 120B. Power train system 110 rotates main rotor blades 120A and optionally tail rotor blades 120B. FIG. 1 illustrates aspects of power train system 110, in accordance with some embodiments. Power train system 110 includes one or more engines 112, a gearbox 160, a rotor mast 114, and a tail rotor drive shaft 116. Engines 112 supply torque to rotor mast 114 via gearbox 160, thus rotating main rotor blades 120A. Engines 112 may also supply torque to tail rotor drive shaft 116, thus rotating tail rotor blades 120B. Gearbox 160 may be a main rotor transmission system. It should be appreciated that power train system 110 may include more gearboxes or other types of gearboxes than gearbox 160 shown. Power train system 110 may include a swashplate for collectively or cyclically controlling the pitch of each of main rotor blades 120A in order to selectively control direction, thrust, and lift of rotorcraft 100.

Fuselage 130 represents the body of rotorcraft 100 and may be coupled to power train system 110 such that power train system 110 and rotor blades 120 move fuselage 130 through the air during operation. Landing gear 140 supports rotorcraft 100 when rotorcraft 100 is grounded. Empennage 150 represents the tail section of the aircraft and is connected to tail rotor blades 120B. Power train system 110 and tail rotor blades 120B may collectively provide thrust in the same direction as the rotation of main rotor blades 120A, so as to counter torque effects created by main rotor blades 120A.

It should be appreciated that teachings from rotorcraft 100 may apply to aircraft other than rotorcraft, such as airplanes, tilt rotor aircraft, and unmanned aircraft, to name a few examples. In addition, teachings of certain embodiments relating to rotor systems described herein may apply to power train system 110 or other power train systems, including but not limited to non-rotorcraft power train systems.

Gearboxes or transmissions have many components that degrade over time. Monitoring methods, such HUMS that monitors vibration, have been used to detect degradation. However, some components located inside a gearbox are difficult, if possible, to monitor with external mounted sensors. Internal sensors can solve these problems, but the nature of internal rotating components requires that the sensors be wireless. Transmitting data from internal wireless sensors requires an antenna that penetrates the housing structure.

Rotorcraft 100 includes a wireless sensor assembly 170 with an internal wireless sensor 180 configured to communicate with a rotorcraft computer 102. In the illustrated rotorcraft 100, wireless sensor 180 is located inside of gearbox 160 proximate a component, such as a rotating gear.

Figure 2:
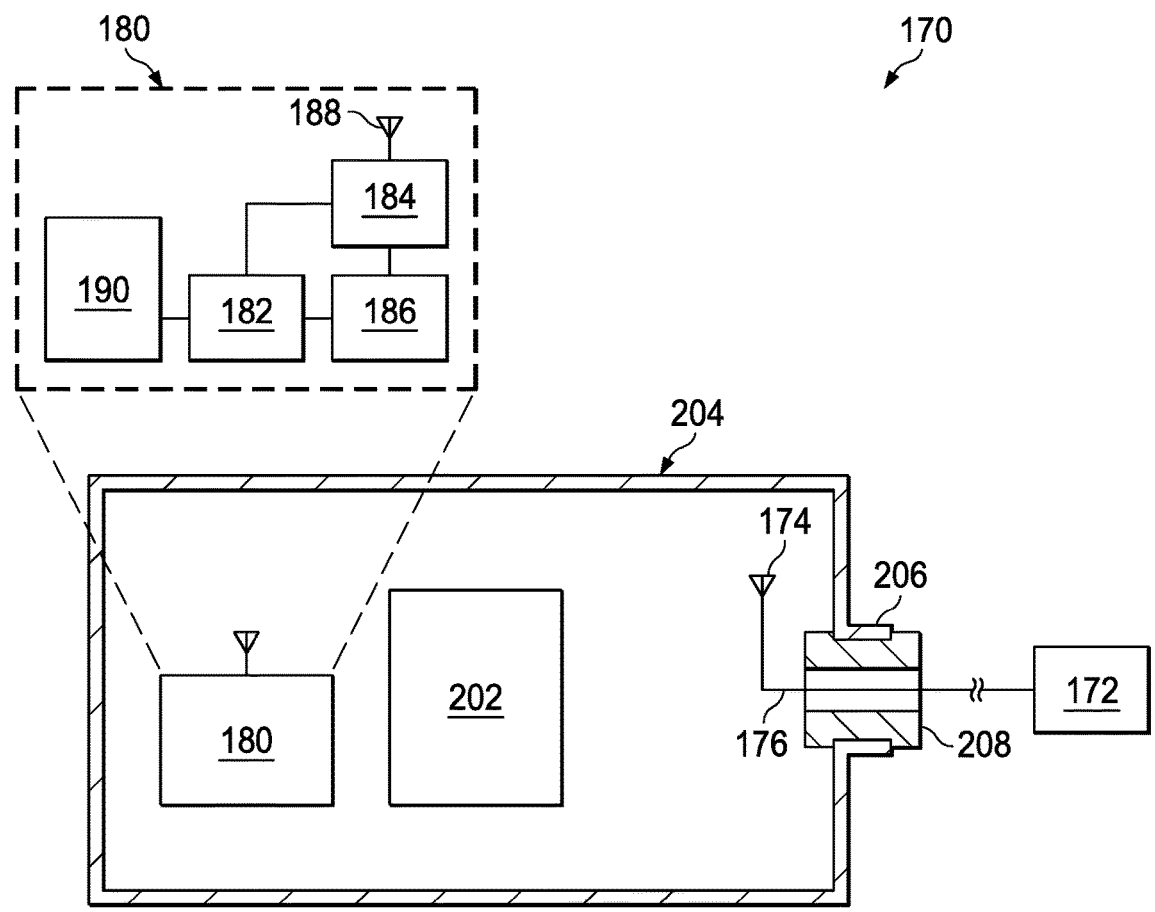
FIG. 2 illustrates an exemplary wireless sensor assembly installed with an enclosed housing.

FIG. 2 illustrates an exemplary wireless sensor assembly (WSA) 170 installed to monitor a component 202 enclosed in a sealed housing 204. A non-limiting example of a housing 204 is the case of a gearbox. Component 202 may be for example a rotating or stationary gear. Wireless sensor assembly 170 includes a wireless gateway 172 and a wireless sensor 180. Wireless sensor 180 is positioned inside of housing 204 adjacent to component 202. Wireless gateway 172 is located exterior of housing 204. Wireless gateway 172 includes an antenna 174 that is located inside of housing 204 and is connected to gateway 172 via a conductor 176. Conductor 176 extends through a penetration 206 in housing 204. Penetration 206 may be enclosed and sealed by a patch 208, such as a bushing. The antenna of sensor 180 and wireless gateway 172 provide a wireless interface for transmission to a receiving device such as a rotorcraft computer.

Wireless sensor 180 includes an energy source 182, a controller 184, a transducer 186, and an antenna 188. In some embodiments, such as the illustrated exemplary embodiment, sensor 180 may include an energy harvesting device 190 to charge energy source 182.

Energy source 182 may be any type of embedded battery, such as a lithium-ion battery, NiMH battery, capacitor, or the like. Energy harvesting device 190 may be configured to convert energy, e.g. vibrations, temperature, and airflow, into electrical energy that is supplied to battery 182 or directly to one or more other components of sensor 180. Energy harvesting device 190 may include, for example, metamaterial cells that produce electricity from energy waves (vibration, heat). In another non-limiting example, energy harvesting device 190 may include a thermoelectric generator.

Controller 184 receives transduced signals from transducer 186 that measures physical parameters of a component being monitored, and transmits the signals over antenna 188. Controller 184 may be any type of controller and may have a processor such as a microprocessor, a microcontroller, an application-specific integrated circuit, a field programmable gate array, or the like. The controller may further include a non-transitory computer readable medium having a program for execution by the processor stored thereon. The program may include instructions for executing the mode assignment and sensing processes described below.

Transducer 186 may be any type of transducer that is acceptable for the desired type of sensor. When sensor 180 is a temperature sensor, transducer 186 may be a diode, thermistor, resistance temperature detector, thermocouple, or the like. When sensor 180 is a vibration sensor, transducer 186 may be an accelerometer, a gyroscope, or the like. When sensor 180 is a debris sensor, transducer 186 may include a moving magnet and two electrodes, which produce a transduced signal indicating the presence of metallic debris between the electrodes. Alternatively, transducer 186 may be operable to produce a Gaussian field and detect interruptions in the Gaussian field, indicating the presence of metallic or non-metallic debris. When sensor 180 is an oil quality sensor, transducer 186 may be an electrochemical pH sensing element having a measuring electrode and a reference electrode, a moisture detector such as a variable resistor, combinations thereof, or the like.

Figure 3:
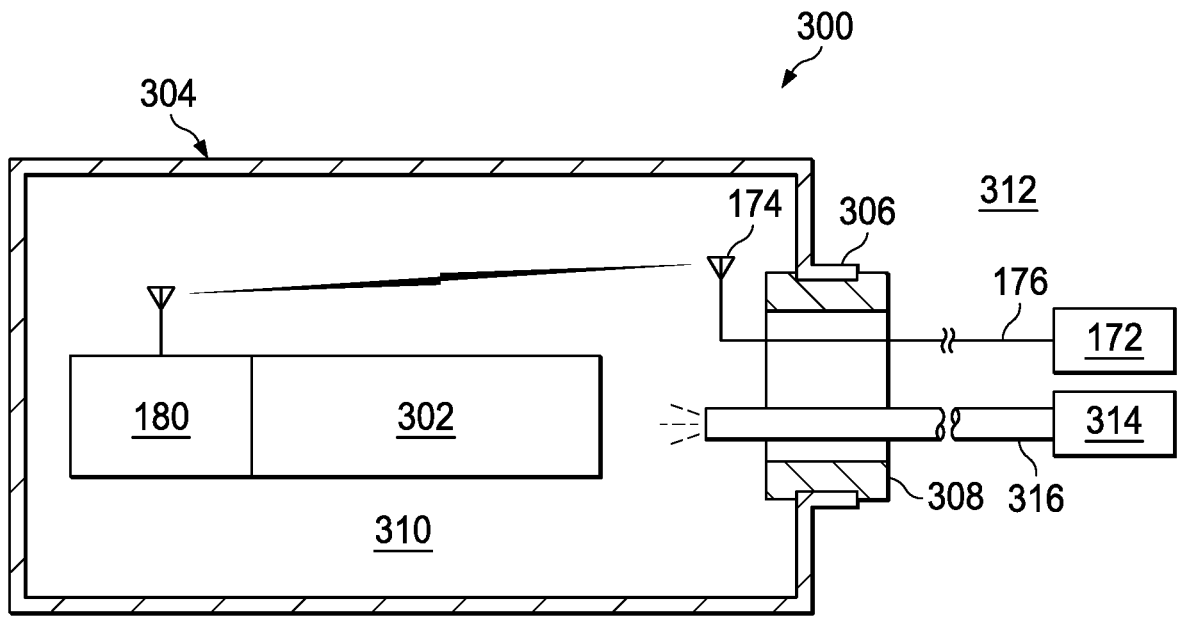
FIG. 3 illustrates an exemplary wireless monitoring system with a multifunctional antenna penetration.

FIG. 3 illustrates an exemplary internal wireless sensor monitoring system 300 with a multifunctional antenna penetration 306. Monitoring system 300 may be incorporated in an aircraft, such as a rotorcraft. Wireless sensor 180 is positioned adjacent to or on a component 302 located in the interior 310 of a gearbox housing 304. Wireless gateway 172 is located exterior 312 of gearbox housing 304 and is in communication through a conductor 176 to gateway antenna 174 positioned inside of housing 304. Conductor 176 is disposed in and passes through an existing penetration 306 that is provided in gearbox housing for an operational system 314. In this exemplary monitoring system 300, operational system 314 is a lubrication system having a conduit 316 for injecting lubricant, e.g., oil, into gearbox housing 304. Penetration is closed and sealed with a patch 308. Penetration 306 is a multifunctional penetration conveying a component of the lubrication system and the wireless gateway antenna.

Figure 4:
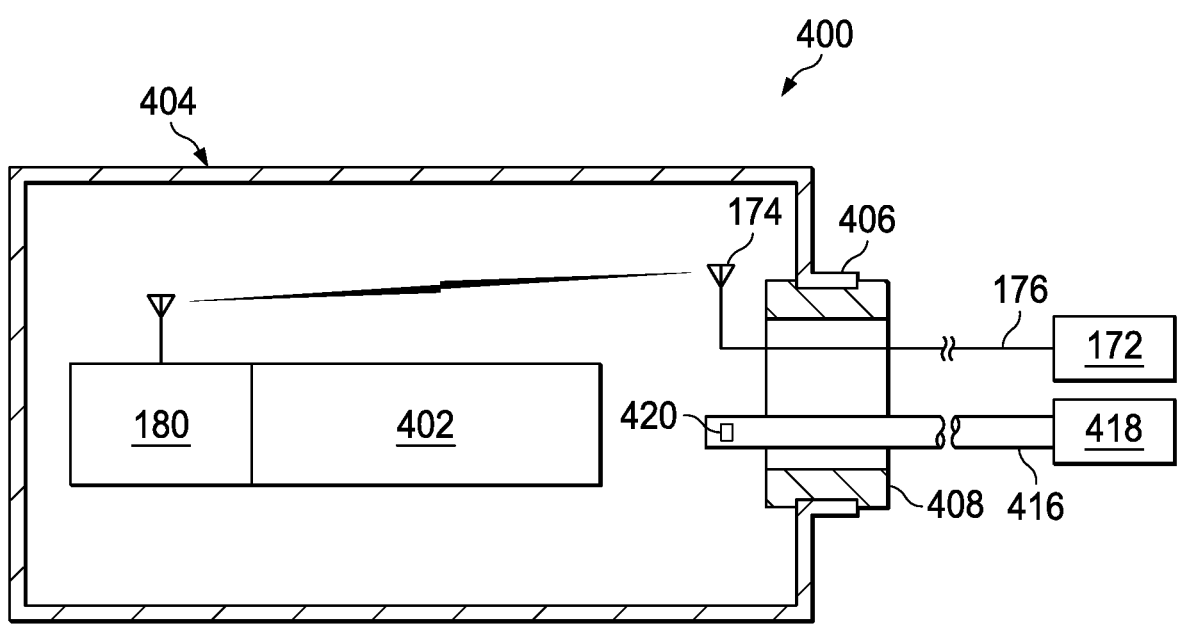
FIG. 4 illustrates another exemplary wireless monitoring system with a multifunctional antenna penetration.

FIG. 4 illustrates another exemplary internal wireless sensor monitoring system 400 with a multifunctional antenna penetration 406. Monitoring system 400 may be incorporated in an aircraft, such as a rotorcraft. Wireless sensor 180 is positioned adjacent to or on a component 402 located inside of a gearbox housing 404. Wireless gateway 172 is located exterior of gearbox housing 404 and is in communication through a conductor 176 to gateway antenna 174 positioned inside of gearbox housing 404. Conductor 176 is disposed in and passes through an existing penetration 406 that is provided in gearbox housing for an operational system 414. In this exemplary monitoring system 400, operational system 414 is a chip or debris sensor, having a transducer 418 coupled to a detector 420, which may be a moving magnet and two electrodes, which produce a transduced signal indicating the presence of metallic debris between the electrodes. Transducer 418 is located outside of gearbox housing 404 and detector 420 is located inside of the gearbox housing with a coupling 416, e.g. conductor, passing through penetration 406. Penetration 406 is closed and sealed with a patch 408. Penetration 406 is a multifunctional penetration conveying a component of the debris sensor and the wireless gateway antenna.

Figure 5:
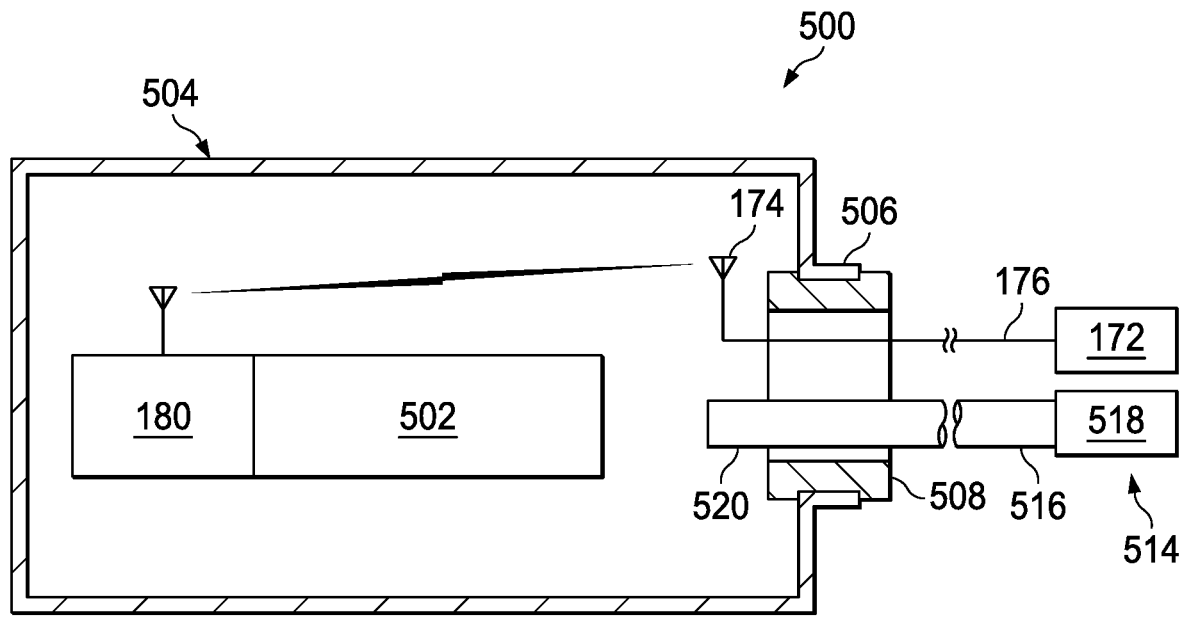
FIG. 5 illustrates another exemplary wireless monitoring system with a multifunctional antenna penetration.

FIG. 5 illustrates another exemplary internal wireless sensor monitoring system 500 with a multifunctional antenna penetration 506. Monitoring system 500 may be incorporated in an aircraft, such as a rotorcraft. Wireless sensor 180 is positioned adjacent to or on a component 502 located inside of a gearbox housing 504. Wireless gateway 172 is located exterior of gearbox housing 504 and is in communication through a conductor 176 to gateway antenna 174 positioned inside of gearbox housing 504. Conductor 176 is disposed in and passes through an existing penetration 506 that is provided in gearbox housing for an operational system 514. In this exemplary monitoring system 500, operational system 514 is an imaging system having a processor 518 (image recorder) located exterior of gearbox housing 504 and lens 520 (sensor chip), light source, located inside of the gearbox housing. A conductor 516 coupling processor 518 and lens 520 passes through penetration 506. Penetration 506 is closed and sealed with a patch 508. Penetration 506 is a multifunctional penetration conveying a component of the imaging system 514 and the wireless gateway antenna.

Figure 6:
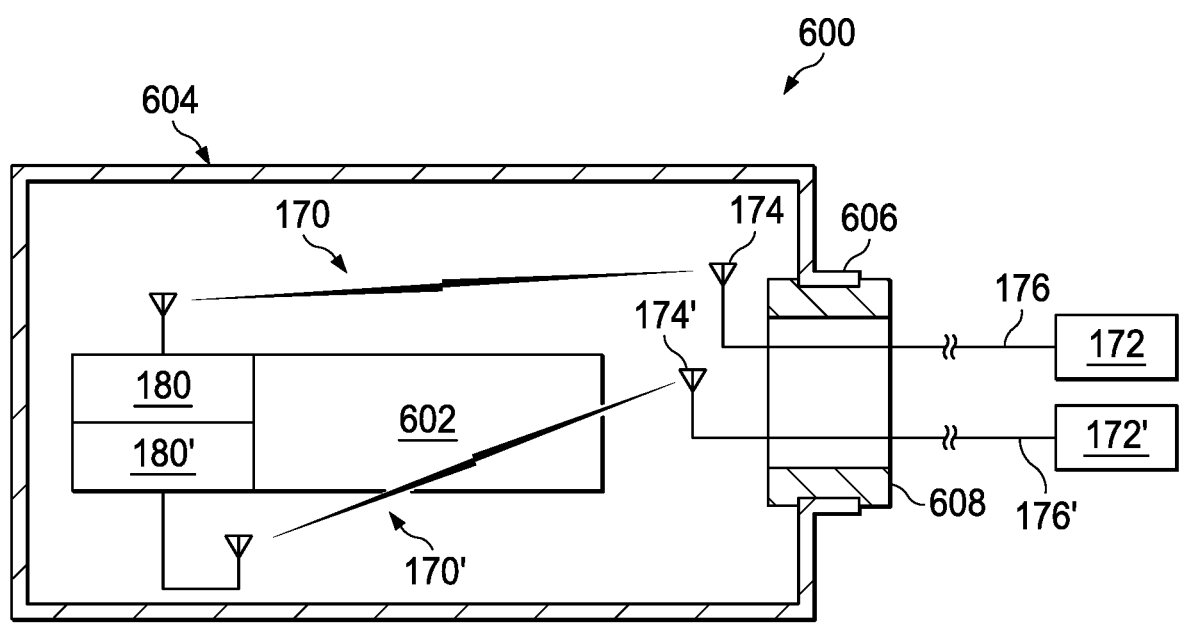
FIG. 6 illustrates another exemplary wireless monitoring system with a multifunctional antenna penetration.

FIG. 6 illustrates another exemplary internal wireless sensor monitoring system 600 using a multifunctional antenna penetration 606 for two or more wireless sensor assemblies 170, identified as first senor assembly 170 and second sensor assembly 170'. Monitoring system 600 may be incorporated in an aircraft, such as a rotorcraft. A first wireless sensor 180 is positioned adjacent to or on a component 602 located inside of a gearbox housing 604. First wireless sensor 180 may be, for example, a vibration sensor. First wireless sensor 180 is configured to communicate with a first wireless gateway 172 located exterior of gearbox housing 604. First wireless gateway 172 is in communication through a first conductor 176 to first gateway antenna 174 positioned inside of gearbox housing 604. Second wireless sensor 180' is also located inside of gearbox housing 604 and second wireless gateway 172' is located exterior of gearbox housing 604 with second gateway antenna 174' located inside the gearbox housing. Multifunctional housing penetration 606 passes first and second conductors 176, 176' reducing the number of penetrations made through housing 604. Penetration 506 is closed and sealed with a patch 608.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include such elements or features.

The term "substantially," "approximately," and "about" is defined as largely but not necessarily wholly what is specified (and includes what is specified; e.g., substantially 90 degrees includes 90 degrees and substantially parallel includes parallel), as understood by a person of ordinary skill in the art. The extent to which the description may vary will depend on how great a change can be instituted and still have a person of ordinary skill in the art recognized the modified feature as still having the required characteristics and capabilities of the unmodified feature. In general, but subject to the preceding, a numerical value herein that is modified by a word of approximation such as "substantially," "approximately," and "about" may vary from the stated value, for example, by 0.1, 0.5, 1, 2, 3, 4, 5, 10, or 15 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure and that they may make various changes, substitutions, and alterations without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. An internal wireless sensor monitoring system comprising:
    a wireless sensor positioned inside of an enclosed housing to monitor a condition in the housing;
    a wireless gateway positioned outside of the enclosed housing;
    a gateway antenna located within the enclosed housing and configured to wirelessly communicate with the wireless sensor; and
    a conductor extending through a penetration in the enclosed housing and connecting the gateway antenna and the wireless gateway.

2. The internal wireless sensor monitoring system of claim 1, wherein the enclosed housing encloses gears.

3. The internal wireless sensor monitoring system of claim 1, wherein the wireless sensor comprises an energy harvesting device configured to convert energy into electric energy.

4. The internal wireless sensor monitoring system of claim 1, wherein the penetration passes a component of an operational system.

5. The internal wireless sensor monitoring system of claim 4, wherein the wireless sensor comprises an energy harvesting device configured to convert energy into electric energy.

6. The internal wireless sensor monitoring system of claim 1, wherein the penetration passes a conduit of a lubrication system.

7. The internal wireless sensor monitoring system of claim 6, wherein the wireless sensor comprises an energy harvesting device configured to convert energy into electric energy.

8. A rotorcraft comprising:
    a wireless sensor positioned inside of a gearbox housing;
    a wireless gateway positioned outside of the gearbox housing;
    a gateway antenna located within the gearbox housing and configured to wireles sly communicate with the wireless sensor; and
    a conductor extending through a penetration in the gearbox housing and connecting the gateway antenna and the wireless gateway.

9. The rotorcraft of claim 8, wherein the wireless sensor comprises an energy harvesting device configured to convert energy into electric energy.

10. The rotorcraft of claim 8, wherein the penetration passes an additional component.

11. The rotorcraft of claim 10, wherein the additional component is a component of a lubrication system.

12. The rotorcraft of claim 8, further comprising an imaging system comprising a first component located inside of the gearbox housing, a second component located outside of the gearbox housing, and a wired connector passing through the penetration and connecting the first component and the second component.

13. The rotorcraft of claim 12, wherein the wireless sensor comprises an energy harvesting device configured to convert energy into electric energy.

14. The rotorcraft of claim 8, further comprising a second wireless sensor located inside of the gearbox housing;
    a second wireless gateway positioned outside of the gearbox housing;
    a second gateway antenna located within the gearbox housing and configured to wirelessly communicate with the second wireless sensor; and
    a second conductor extending through a penetration in the gearbox housing and connecting the gateway antenna and the wireless gateway.

15. The rotorcraft of claim 14, wherein the wireless sensor comprises an energy harvesting device configured to convert energy into electric energy.

16. A method comprising:
    positioning a wireless sensor inside of a gearbox housing, the wireless sensor comprising a controller, a transducer, and a sensor antenna;
    transmitting, via the sensor antenna, data from the wireless sensor to a gateway antenna positioned within the gearbox housing;
    communicating the data from the gateway antenna over a wired connection to a wireless gateway located outside of the gearbox housing, the wired connection passing through a penetration in the gearbox housing; and
    transmitting the data from the wireless gateway to a rotorcraft computer.

17. The method of claim 16, further comprising converting energy into electric energy and supplying the electric energy to the wireless sensor.

18. The method of claim 16, wherein the penetration passes an additional component.

19. The method of claim 16, further comprising an imaging system comprising a first component located inside of the gearbox housing, a second component located outside of the gearbox housing, and a wired connector passing through the penetration and connecting the first component and the second component.

20. The method of claim 19, further comprising converting energy into electric energy and supplying the electric energy to the wireless sensor.

* * * * *

UNITED STATES PATENT AND TRADEMARK OFFICE
CERTIFICATE OF CORRECTION

PATENT NO. : 11,341,790 B2  
APPLICATION NO. : 16/743988  
DATED : May 24, 2022  
INVENTOR(S) : Scott David Poster et al.

Page 1 of 1

It is certified that error appears in the above-identified patent and that said Letters Patent is hereby corrected as shown below:

In the Claims

Column 7, Claim 8, Line 39     Replace "wireles sly" with --wirelessly--

Signed and Sealed this  
Twenty-second Day of November, 2022

Katherine Kelly Vidal  
*Director of the United States Patent and Trademark Office*